Aug. 25, 1942.    R. F. DONALDSON    2,294,110
CHASSIS CONSTRUCTION
Filed March 31, 1941    3 Sheets-Sheet 1

INVENTOR:
ROBERT F. DONALDSON
BY
Charles S. Penfold   ATTORNEY.

Aug. 25, 1942.  R. F. DONALDSON  2,294,110
CHASSIS CONSTRUCTION
Filed March 31, 1941  3 Sheets-Sheet 2
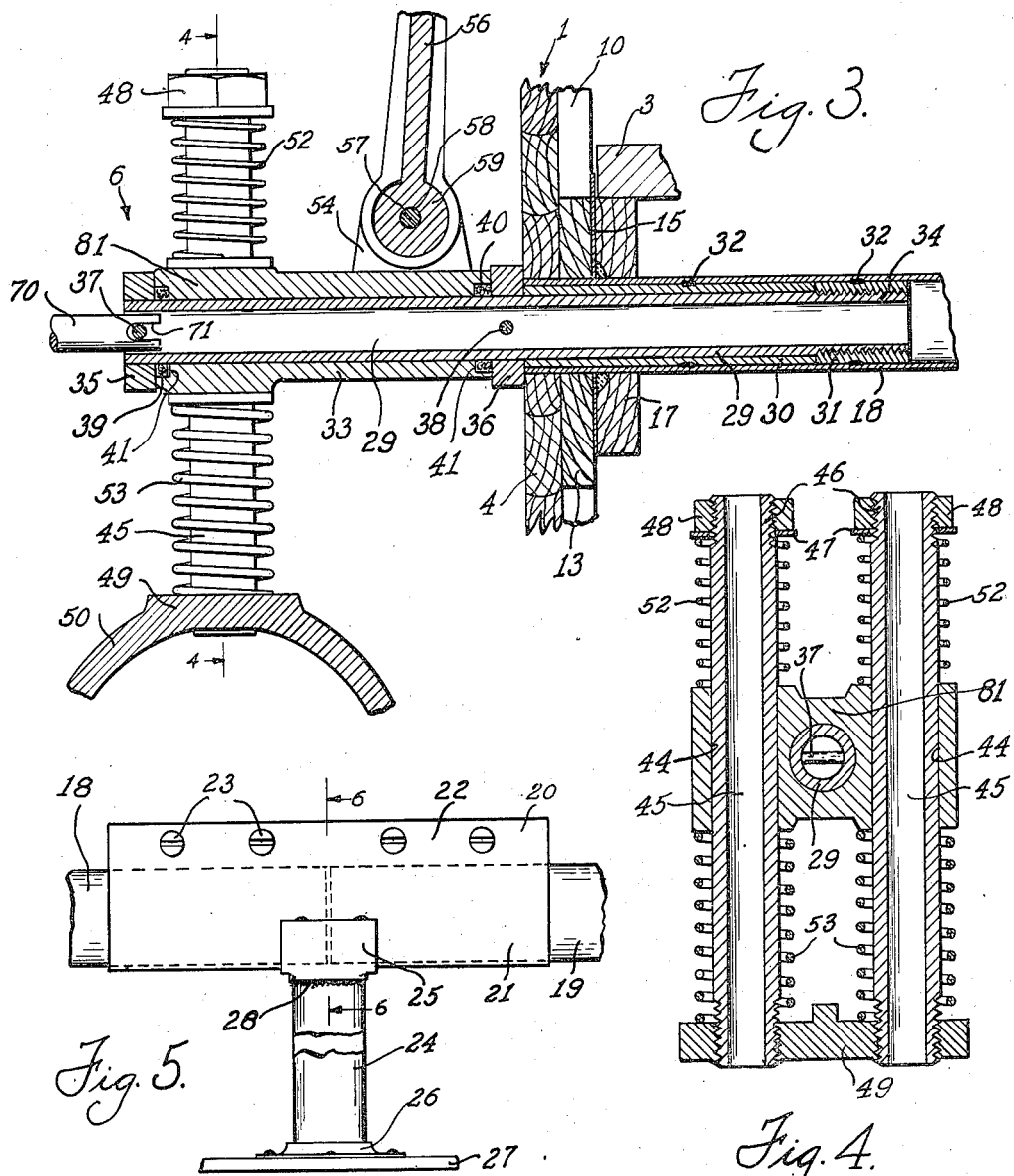
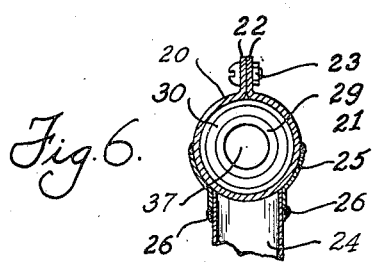
ROBERT F. DONALDSON
INVENTOR.
BY Charles S. Penfold
ATTORNEY.

Aug. 25, 1942.  R. F. DONALDSON  2,294,110
CHASSIS CONSTRUCTION
Filed March 31, 1941  3 Sheets-Sheet 3
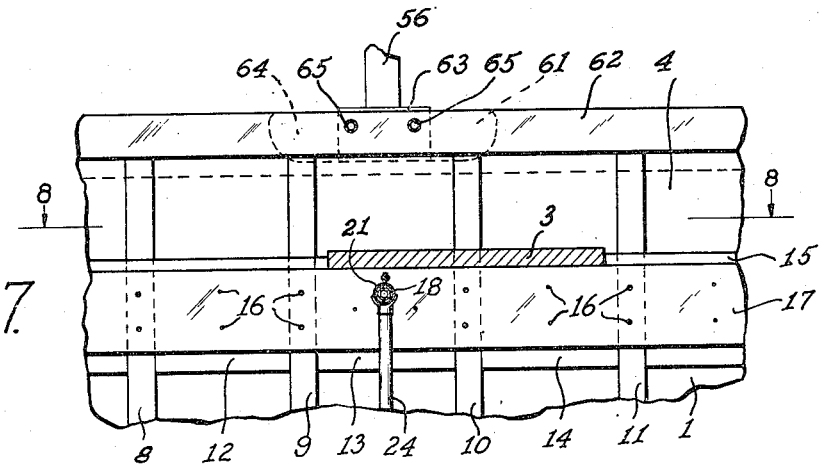
Fig. 7
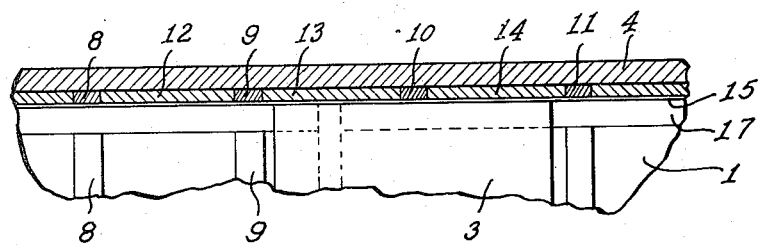
Fig. 8.
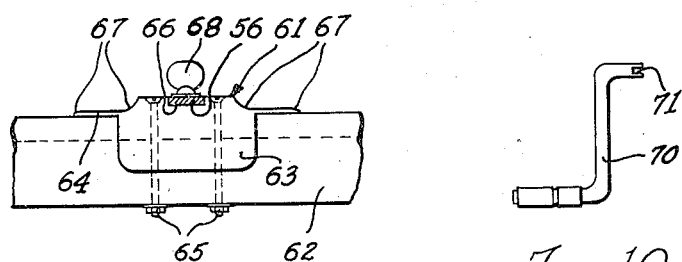
Fig. 9.
Fig. 10.
ROBERT F. DONALDSON
INVENTOR.
BY Charles S. Penfold
ATTORNEY.

Patented Aug. 25, 1942

2,294,110

UNITED STATES PATENT OFFICE 2,294,110

CHASSIS CONSTRUCTION

Robert F. Donaldson, Tekonsha, Mich.

Application March 31, 1941, Serial No. 386,159

12 Claims. (Cl. 9—1)

This invention relates generally to running gear or chassis constructions, and more particularly has to do with apparatus of this character which is primarily adapted for association with respect to a boat, so that the boat may be hooked onto the rear of an automobile and transported about like a trailer.

It is to be understood, of course, that the particular application of the invention, just referred to, in no way limits the use of the chassis, as same has other applications, for example, in conjunction with the fuselage of an aeroplane.

The vast majority of boats, including rowboats, require separate trucks or trailers to support them, while in transit and otherwise. Such trailers are generally quite expensive, and due to their heavy weight and cumbersome size are unwieldy to handle, especially after the trailer is disconnected. Moreover, these trailers are usually of such a character that it is very difficult to mount and dismount the boat with respect thereto.

Accordingly, one particular object of the invention is to avoid the disadvantages above referred to, by providing a chassis construction consisting of a pair of inexpensive interchangeable compact units, comparatively light in weight, which can be easily and quickly adjustably connected or disconnected with respect to a boat. Also, the units are of such a size that they take up a minimum amount of space, and this is important from the standpoint of storage.

Another object is to provide improved mounting means carried by the boat for supporting the units, including means for bracing the mounting means.

An additional object is to provide means for reinforcing the side walls of the boat to form a substantial foundation for supporting the mounting above referred to.

A further object is to provide units which are interchangeable, efficient in operation, very sturdy or substantial in construction to withstand hard usage, and which may be economically manufactured and installed on a production basis.

Another object of the invention is to provide lever means associated with each unit for holding or maintaining the units in predetermined positions with respect to the boat.

Other objects and advantages of the invention will become apparent after consideration of the forthcoming description in conjunction with the drawings annexed hereto.

Referring to the drawings wherein the preferred embodiment to which the invention is susceptible is clearly illustrated, and the parts are identified by numerals:

Figure 3 is an enlarged sectional view in elevation, taken substantially on line 3—3 of Figure 1, and clearly depicts certain details of construction;

Figure 4 is a vertical section taken substantially on line 4—4 of Figure 3, showing details of the means associated with each unit for resiliently supporting the boat;

Figure 5 is a view of the mounting means carried by the boat, and of a part of the means for connecting and bracing the mounting;

Figure 6 is a section taken substantially on line 6—6 of Figure 5, illustrating other details respecting the mounting means and bracing therefor;

Figure 7 is an elevational view of one of the side walls of the boat, looking outwardly from the inside thereof;

Figure 8 is a section taken substantially on line 8—8 of Figure 7, showing certain details of construction;

Figure 9 is a top view, partly in section depicting a part of the fastening means carried by the boat whereby the lever of each unit may be connected to the boat to prevent rotation of the unit; and Figure 10 is a view of the crank used for connecting and disconnecting the units to the boat.

Figure 1:
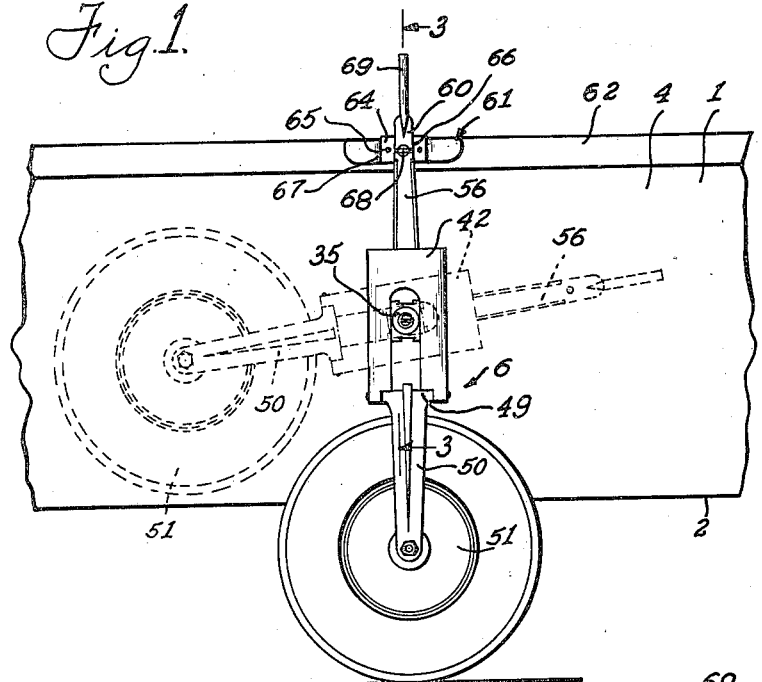
Figure 1 is a side view in elevation of one of the units as applied to the side of a boat; the dotted line position of the unit indicating one position to which it may be moved to permit the same to be disconnected from the boat.

As mentioned above, one object of the invention is to provide satisfactory foundations for supporting the mounting means for the chassis units, and these will first be considered.

The boat 1 may be of conventional form, including, among other things, a bottom wall 2, a middle seat 3, and side walls 4 and 5 which carry the units 6 and 7 respectively. The units are preferably adapted for connection to the side walls at points slightly to the rear of the middle seat, or at such points that the boat is properly supported and balanced for hauling behind an automobile. Accordingly, it is desirable that some provision be made for reinforcing the sides adjacent the extremities of the middle seat. The side walls are permanently fastened to the usual spaced apart ribs which run in a direction transverse to the longitudinal axis of the boat; and secured to the side walls in the spaces between the ribs 8, 9, 10, and 11, near the center of the boat, are a plurality of wooden blocks, 12, 13, and 14, the inner faces of which lie flush with the inner faces of the ribs. These blocks may be anchored in place by any suitable means, such as by screws and glue. A steel plate 15 is preferably permanently fastened to and over the ribs and blocks, by screws 16, or the equivalent. The blocks and plates may be constructed to reinforce the side walls over any area desired, but are preferably made to cover sections approximately eight inches high and two feet in length. A longitudinally extending seat rail 17 is fastened to the ribs, blocks, and partially over the metal plate 15 adjacent each side of the boat. As shown in Figure 3, the side wall 4, block 13, plate 15, and seat rail 17, are each provided with an aperture, which apertures are arranged in alignment.

The mounting means for journalling and supporting the units will now be described. The mounting means, among other things, is preferably comprised of a pair of elongated cylindrical tubular sections or members 18 and 19, the outer extremities of which project through and seat in the holes formed by the aligned apertures above referred to, as clearly shown in Figures 3 and 5. The inner extremities of these tubular sections 18 and 19 may be connected together in any suitable manner, but as herein shown, are preferably connected through the intermediation of a coupling device 20. This device consists of a split tubular sleeve portion 21 within which the inner ends of the sections are disposed, and wing portions 22 having small bolts 23 projecting therethrough for clamping the device in place about the sections. This device may be made in any length desired, but is preferably of length sufficient to firmly grip the sections and maintain them in alignment. It is, of course, to be understood, that a single tubular section or member could be used in lieu of two sections. However, the application of two sections has been found to be more practical from the standpoint of assembly, for the reason that same can be more easily fitted or installed in boats having different widths. Moreover, this arrangement provides for axial adjustment of the units in a direction transverse to the longitudinal axis of the boat. This fact is of particular importance in those cases where it is necessary to position the units outwardly from the sides of the boat to compensate for the space taken up by splash rails, not shown, or the flaring of the sides. The tubular sections are preferably arranged so that their outer ends extend slightly outward with reference to the outer surfaces of the side walls, so that certain movable parts on the chassis units will not engage and damage the walls.

As clearly depicted in Figures 5 and 6, the inner extremities of the tubular sections are preferably supported by a post or pillar 24 which is provided adjacent its upper end with a trough or channel portion 25, and its lower end is preferably attached to a flange piece 26, the latter of which is adapted for permanent connection to the floor 27 of the boat by screws or the equivalent. The channel portion is preferably permanently anchored to the post 24 by welding as indicated at 28, and the coupling is preferably similarly connected to the channel, so as to provide a more or less unitary assembly, entirely devoid of vibration. The tubular sections and post assembly means are conveniently located directly under the middle seat of the boat, but of course may be otherwise disposed, depending on the type or character of the boat, and particularly its interior construction.

In order to provide a good bearing surface for the axles or shafts 29 of the chassis units, a tubular bearing member 30 is arranged within and adjacent each extremity of each of the tubular sections 18 and 19. An annular internally threaded element 31 is also disposed in each of the sections in abutting relation with the inner ends of the bearing members. These bearing members and elements are preferably unitarily secured against movement to the respective sections by welding as indicated at 32, or by other suitable means. Obviously, if found advantageous, the bearing members 30 could be entirely omitted, in which event, the shafts and sections would be made to take each other. Also, it is immaterial whether the annular elements are arranged in abutting relation with the bearings.

Thus far it should be clearly apparent that improved means have been provided for reinforcing the boat to form a substantial foundation at the places where the units are adapted to be connected, including improved means for rotatably mounting the units, and means for supporting or bracing the mounting means, all of said means being of such a character that same can be easily and quickly assembled or installed with respect to substantially any type of boat.

As stated above, one particular object of the invention is to provide improved running gear for a boat, or other instrumentality. This gear is preferably comprised of at least a pair of independently operable units which can be easily and quickly connected or disconnected with respect to the boat. Each unit is made relatively light in weight for easy handling, yet sufficiently substantial and durable to withstand considerable wear and shock. The units 6 and 7 are interchangeable so that it is immaterial as to which unit is applied to any one side of the boat. In other words, the units are substantially identical, and in view of this fact, it is believed that a description of one will suffice.

Referring primarily to Figure 3, the unit 6 includes, among other things, the tubular shaft or axle 29, having a tubular body member 33 rotatably mounted adjacent its outer extremity; and its inner extremity is of a length sufficient to slidably fit into the bearing member 30 with its threaded end portion 34 in engagement with the threaded element 31 which is permanently held in place next to the bearing. The body member 33 may be made from any suitable metal and constructed as desired, but is preferably cast, and designed for exceptional hard usage, as same constitutes a support for other parts of the unit. The body is held against longitudinal movement or axial thrust with respect to the shaft 29 by a pair of annular collars 35 and 36, which surround the shaft and provide abutments or stops adjacent the ends of the body. These collars are firmly held in place by means of pins 37 and 38 which extend through apertures provided therefor in the collars 35 and 36, and in the shaft. Fiber gaskets 39 and 40 seated in end recesses 41 of the body member may be provided to exclude dust and other foreign matter from the bearing surfaces. Provision may also be made for lubricating certain of the movable parts.

As clearly shown, the collar 36 may also serve as a spacer member adapted to engage the outer ends of the tubular section 18 and bearing 30. The collar 35 is preferably disposed near the outer end of the shaft 29 for another purpose to be described subsequently. Obviously, any other suitable means may be employed for holding the body 33 against longitudinal movement on the shaft.

Figure 2:
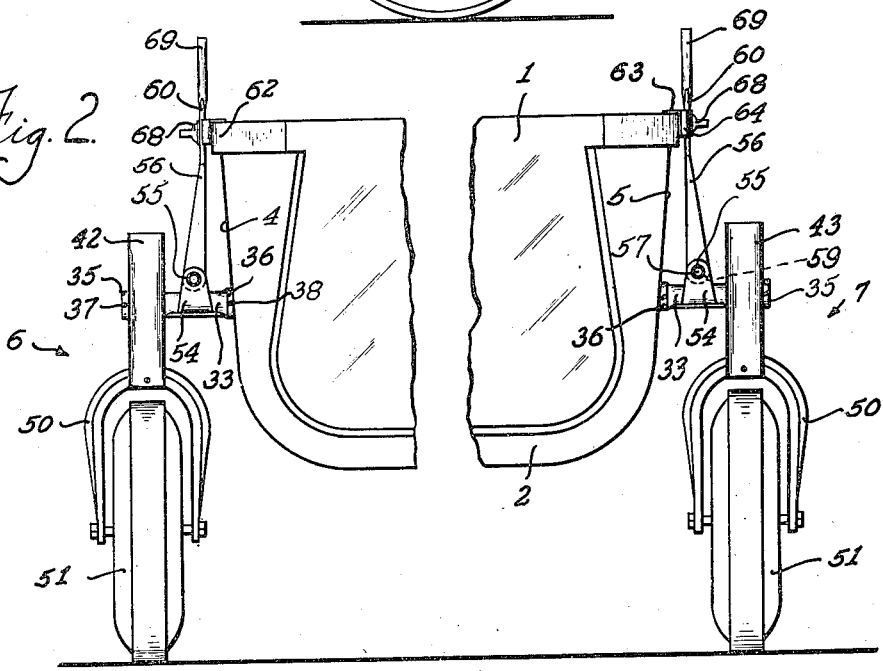
Figure 2 is an end view of a boat showing the units attached to the sides thereof.

The outer extremity of the tubular body member is preferably enlarged or widened an appreciable extent to form a head portion 81, as illustrated in Figures 3 and 4, which figures do not show the hoods 42 and 43 evident in Figures 1 and 2. This head portion 81 is preferably provided with a pair of substantially vertically disposed parallel bores 44, one on each side of the shaft 29. A tubular spindle 45 is reciprocally mounted in each of the bores, the upper ends of the spindles being threaded as indicated at 46 and provided with washers and nuts 47 and 48, and the lower ends are threadedly connected to the top portion 49 of a wheel supporting member or fork 50. A wheel 51 having a pneumatic tire is carried by the fork. A relatively weak helical spring 52 is carried by each of the spindles 45 between the washers 47 and the head portion 81 of the body member, and a relatively strong helical spring 53 is also carried by each spindle between the head and the top part of the fork.

In view of the fact that the lower springs 53 provide means for resiliently supporting the boat, same are preferably made rather heavy and strong to withstand the severe shock and vibration to which same are subjected. The upper springs 52 provide means for cushioning or absorbing the shock encountered by the upward movement of the boat, and accordingly are not made as strong as the lower springs. The spindles 45 are preferably made tubular as same are stronger and tend to decrease the weight of the unit. The nuts 48 are desirable for adjusting the tension on the springs. The principles of design and construction embodied in this section of the unit provides for easy and quick assembly of the parts. It is of course to be understood that in lieu of the two pairs of springs just described, a single spring could be substituted for each pair.

The means or device employed for lowering and elevating each of the units in a plane substantially parallel to the longitudinal axis of the boat is unique and offers advantages over existing devices now in use.

Referring again to the unit 6, the tubular body member 33 is preferably provided with a pair of upstanding spaced apart integral lugs 54, each having an aperture 55 adjacent its upper end. A lever 56 is pivotally supported by these lugs, by means of a pin 57 passing through the apertures 55, and an aperture 58 provided therefor in the lower enlarged portion 59 of the lever. This lever is adapted for pivotal movement in a plane corresponding to the longitudinal axis of the shaft, or in other words, in a plane transverse to the longitudinal axis of the boat. Moreover, in view of the fact that the body member is journalled upon the tubular shaft 29, the lever may be used to rotate the body member and associated structure, including the wheel and fork therefor, in a circuitous path about the shaft to lower or elevate the unit as desired.

As illustrated in Figures 1, 2 and 3, each unit is held or maintained in a normal upstanding or erect position for supporting the boat, by detachably securing or attaching the upper extremity 60 of the lever 56 to a fastening device or a catch 61 provided therefor adjacent the top rail 62 of the boat.

This fastening device 61 may be constructed as desired, but is preferably made in the form of an angle piece, including a top planar portion 63 seated upon the top rail 62, and a side portion 64. Bolts 65 passing through the side portion and rail as shown in Figures 1 and 9 have proven satisfactory for anchoring the catch in place. The side portion 64 is preferably made rather long so as to protect the boat from damage when the lever is being connected and disconnected with respect to the catch. This side portion is provided with a centrally disposed notch or seat 66 which receives the lever 56, and is preferably curved or flared at various places, as indicated at 67 whereby to assist in piloting the lever into the notch. A thumb screw 68 or the equivalent passing through the lever and into the catch is employed to firmly hold the lever in the notch.

In view of the foregoing it should be evident that to rotate the unit about its axle or shaft to lower one side of the boat, it is only necessary to grasp the handle 69 of the lever 56, remove the thumb screw 68, and then release the lever from the notch 66, whereupon slight movement of the lever in either a backward or forward direction will allow the boat to swing or tilt downwardly so that the bottom along one side thereof will engage the ground. The weight of the boat is sufficient to cause sudden rotation of the unit, and for this reason it is desirable that a relatively strong grip be taken on the lever so as not to permit the boat to accidentally fall. When the boat is so positioned on its side it is a very simple matter to disconnect the unit from the boat. A crank 70 of the character illustrated in Figure 10 is used for this purpose. This crank is provided with a notch or bifurcation 71 adjacent its operating end, and it is merely necessary to insert this end into the tubular shaft or axle 29, as shown in Figure 3, so that the bifurcation 71 receives the pin 37 fixed to the shaft, and by rotating the shaft in the proper direction its threaded end will be released from the threaded element 31, in which event the complete unit may be entirely removed or disconnected from the boat. The same procedure is followed regarding the other unit for lowering the other side of the boat, to permit disconnection of the unit. If found desirable, both units may be operated to lower the boat to a resting position on the ground before either unit is detached.

To connect the units to the boat the stub shafts 29 are inserted into the mounting means carried by the boat and then screwed into place by the detachable crank 70, whereupon the levers are then operated to rotate the units to their normal upstanding positions to support the boat horizontally as shown in Figure 2.

Although reference is made to the fact that the units may be attached or detached to the boat while it is at rest on the ground, or other support, it is to be distinctly understood that they may be disconnected from the boat while it is in the water. Also, if found desirable, the units may remain connected to the boat while afloat, or provisions may be made to hold the wheels in an elevated position above the water. Moreover, if deemed expedient a cross bar may be attached to the levers, whereby both units may be simultaneously operated from within the boat.

Accordingly, it will be apparent that improved mounting means, and bracing and reinforcing means therefor have been provided on a boat, including unique chassis or carriage units which can be easily and quickly detachably connected to the mounting means.

I claim:

1. In a unit of the kind described, a shaft having means at one extremity for connection with a support, a tubular body member rotatably carried by said shaft, means for holding the body against longitudinal movement on the shaft, one extremity of said body being provided with a plurality of holes, spindles slidably mounted in said holes, abutments provided adjacent the upper ends of the spindles and means for supporting a wheel secured to the lower ends, resilient means adjacent said spindles between said body member and said abutments and between the body and the wheel supporting means, and a lever pivotally mounted on the body for rotating same relative to the shaft and adapted for connection to the support for holding the body member in place after being rotated to the desired position.

2. In a unit of the kind described, a shaft having means at one extremity for connection with a support, a tubular body member rotatably carried by said shaft, means for holding the body against longitudinal movement on the shaft, one extremity of said body being provided with a plurality of holes, spindles slidably mounted in said holes, abutments provided adjacent the upper ends of the spindles and means for supporting a wheel secured to the lower ends, resilient means adjacent said spindles between said body member and said abutments and between the body and the wheel supporting means, a lever pivotally mounted on the body for rotating same relative to the shaft to a normal predetermined position and adapted for connection to the support for holding the body in said position, and means carried by the shaft adapted for connection with a crank whereby the shaft may be rotated with respect to the tubular body member when the latter is in any position other than normal.

3. A mounting for a wheel including a shaft, a tubular body member carried by the shaft, a plurality of holes provided in said body member transverse to its longitudinal axis, spindles reciprocally mounted in said holes, means for supporting a wheel connected to the lower ends of said spindles, adjustable abutment means provided adjacent the upper ends of said spindles, a relatively weak spring surrounding each spindle between the abutments and the body, and a relatively strong spring between the body and the wheel supporting means for resiliently supporting the latter with respect to the body member.

4. A mounting for a wheel including a shaft, a tubular body member carried by the shaft, means carried by the shaft on each side of the element for holding the member against reciprocation relative to the shaft, a plurality of holes provided in said body member transverse to its longitudinal axis, spindles reciprocally mounted in said holes, means for supporting a wheel threadedly connected to the lower ends of said spindles, abutment means provided adjacent the upper ends of said spindles, and a spring surrounding each spindle between the abutments and the body and between the body and the wheel supporting means for resiliently supporting the latter with respect to the body member.

5. In combination: a boat, a substantially horizontal disposed rod member extending through the side of the boat, a part of a connection means carried by that part of the member within the boat, a tubular shaft carried by said rod member having means cooperable with the said part of the connection means for securing the shaft in place, a tubular element rotatably carried by that part of the shaft extending outwardly from the boat, a wheel and means for supporting the same carried by said tubular element, connection means on the boat above the shaft, a lever pivotally connected to said element for moving the element to rotate the wheel and means for supporting the same as a unit in a vertical plane substantially parallel to the longitudinal axis of the boat so that the boat may be raised or lowered as desired, means cooperable with the connection means on the boat for securing the lever in a generally upstanding position including the wheel supporting means, and means provided adjacent the outer end of the shaft whereby a crank may be connected thereto to rotate the shaft to connect or disconnect the same with respect to that part of the connection means carried by the rod member when the lever is detached from the boat.

6. In combination: a boat, a substantially horizontal disposed tubular member extending through the side of the boat, a part of a connection means carried by that part of the member within the boat, a tubular shaft disposed in said tubular member having means cooperable with the said part of the connection means for securing the shaft in place, a tubular element rotatably carried by that part of the tubular shaft extending outwardly from the boat, a spacer member carried by and secured to the shaft disposed between the boat and the inner end of the element, a wheel and means for supporting the same carried by said tubular element, connection means on the boat above the shaft, a lever pivotally connected to said tubular element for moving the tubular element to rotate the wheel and means for supporting the same as a unit in a vertical plane substantially parallel to the longitudinal axis of the boat so that the boat may be raised or lowered as desired, means cooperable with the connection means on the boat for securing the lever in a generally upstanding position including the wheel supporting means, and means provided adjacent the outer end of the shaft whereby a crank may be connected thereto to rotate the shaft to connect or disconnect the same with respect to that part of the connection means carried by the tubular member when the lever is detached from the boat.

7. In apparatus of the kind described, a shaft adapted for connection with a boat, an elongated tubular body member rotatably mounted on said shaft, a frame carried by said body member adapted for movement transverse to the longitudinal axis of the member, means for supporting a wheel secured to said frame, of resilient means interposed between said body and said wheel supporting means, an arm connected to the body member whereby said body member including the frame and wheel supporting means may be rotated with respect to said shaft, the connection between the arm and body being such that the arm may be moved in a direction generally transverse to the rotary movement of the body, and means on the arm assisting to secure the arm to the boat for holding the body member against rotation.

8. In apparatus of the kind described, a shaft adapted for connection with a boat, an elongated tubular body member rotatably mounted on said shaft, a frame carried by said body member adapted for movement transverse to the longitudinal axis of the member, means for supporting a wheel secured to said frame, abutments provided adjacent the upper extremity of the frame, resilient means interposed between the body member and said abutments and between said body and said wheel supporting means, an arm connected to the body whereby said body including the frame and wheel supporting means may be rotated with respect to said shaft, the connection between the arm and body being such that the arm may be moved in a direction generally transverse to the rotary movement of the body, and means on the arm assisting to secure the arm to the boat for holding the body member against rotation.

9. A chassis unit adapted for association with respect to a boat, including a tubular body member, an axle member rotatably mounted in and extending outwardly from one extremity of the body member for connection with mounting apparatus secured to the boat, an enlargement provided adjacent the other extremity of the body member, a pair of apertures provided in said enlargement, a pair of upstanding spindles slidably mounted in said apertures and extending outwardly from each side of the enlargement, means providing a support for a wheel secured to the lower ends of the spindles, abutments adjacent the upper ends of said spindles, a pair of relatively strong springs carried by the spindles between the enlargement and said means, and a pair of weak springs carried by the spindles between the abutments and the enlargement whereby to resiliently support the body member with respect to the wheel supporting means.

10. In combination: a boat having a seat, a block secured to the inner surface of each side wall of the boat adjacent the extremities of the seat, a metal plate secured to the inner surface of each block, aligned apertures in the walls of the boat, block, and plate, a tubular element transversely bridging the boat under the seat with its extremities disposed in the said aligned apertures, welds securing the element to said metal plates, means secured to the element and to the bottom of the boat for bracing the element and side walls of the boat, a cylindrical bearing extending inwardly from each end of the element, a pair of internally threaded members fixed within the element with one adjacent the inner extremity of each bearing, a tubular shaft extending inwardly into each bearing member and having a threaded portion engaging the threaded members, a tubular body rotatably mounted on each shaft, a ring carried by and secured to each shaft interposed between and engaging the body and boat, a second ring engaging the body carried by and secured to the free end of the shaft by a pin passing through the ring and shaft, said rings providing means to prevent longitudinal movement of the bodies relative to the shafts and maintain the bodies in predetermined spaced apart positions with respect to the sides of the boat, a pair of holes provided in each body transverse to its longitudinal axis, a pair of spindles slidably mounted in each pair of holes, said spindles having threaded upper and lower extremities, a yoke supporting a wheel threadedly connected to the lower extremities of each pair of spindles, nuts threadedly connected to the upper extremities of the spindles, a pair of weak helical springs carried by each pair of spindles between the nuts and the body, and a pair of strong helical springs carried by each pair of spindles between the body and the yoke providing a resilient mounting for cushioning the upward and downward movement of the boat relative to the wheel supporting means, fastening means provided adjacent the upper extremity of each side wall of the boat, an arm pivotally mounted on each body for movement in a plane generally in alignment with the longitudinal axis of the body for rotating each body to raise or lower the boat, said arms having means cooperable with the fastening means on the boat for normally maintaining the arms and the wheel supporting means in upstanding positions to hold the boat in an elevated position, said pins carried by the shafts being so disposed that a crank having a slot therein may receive the pins whereby when the arms are detached from the boat, the crank may be turned to rotate each shaft to release the same from said internally threaded member to permit each shaft and parts carried thereby to be entirely disconnected from the boat.

11. A wheel attachment for a boat, including in combination: a shaft adapted for entry into the side wall of the boat between its upper and lower extremities, a body member rotatably mounted on the shaft, wheel supporting means carrying a wheel mounted on the body member, and a lever connected to the body and adapted for movement outwardly with respect to said side wall when the attachment is connected thereto whereby the body including the wheel and supporting means therefor may be rotated about the shaft to raise and lower the boat when the shaft is connected thereto.

12. An attachment according to claim 11, in which the shaft is provided with means which may be engaged by a rotatable element whereby the shaft may be rotated to connect or disconnect the unit from the boat.

ROBERT F. DONALDSON.